United States Patent Office 3,719,619
Patented Mar. 6, 1973

---

3,719,619
QUICK DRYING COATINGS CONTAINING COPOLYMERS HAVING t-ALIPHATIC HYDROCARBON GROUPS AND t-ALIPHATIC ALKYD RESINS
Nobuyoshi Nagata, Nara-shi, and Ryuzo Mizuguchi, Osaka, Japan, assignors to Nippon Paint Co., Ltd., Osaka, Japan
No Drawing. Filed Sept. 2, 1970, Ser. No. 69,113
Claims priority, application Japan, Sept. 8, 1969, 44/70,548
Int. Cl. C08b 21/08; C08f 21/04; C08g 39/10; C09d 3/64
U.S. Cl. 260—22 CB      26 Claims

ABSTRACT OF THE DISCLOSURE

A quick drying coating composition comprising a solvent and a resin composition consisting essentially of (A) 100 parts by weight of a copolymer containing 5 to 70% by weight of a monomer represented by the formula:

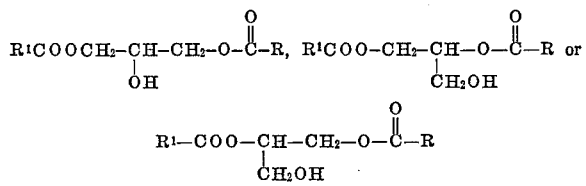

wherein R stands for a tertiary aliphatic hydrocarbon group having in total 4 to 26 carbon atoms; $R^1$ stands for an $\alpha,\beta$-ethylenically unsaturated hydrocarbon group having 2 to 3 carbon atoms which may have one $COOR^2$ group wherein $R^2$ is a hydrogen atom or an alkyl group having 1 to 4 carbon atoms and 30 to 95% by weight of at least one unsaturated monomer copolymerizable therewith and (B) 5 to 600 parts by weight of an alkyd resin containing 1 to 70% by weight of a tertiary aliphatic carboxylic acid represented by the formula:

HOOCR wherein R has the same meaning as defined above. Said coating composition is excellent in properties such as coating-workability, high build, weather-resistance, gloss, chemical resistance and adhesiveness.

---

The present invention relates to a quick drying coating composition comprising a copolymer and an alkyd resin as the principal vehicle. A quick drying synthetic resin coating composition comprising as the principal vehicle a copolymer obtained by copolymerizing an acrylate, a methacrylate or styrene is usually called as acryl resin paint or vinyl resin paint.

Though the dried film of these acryl or vinyl resin paints has excellent durability, and gloss-holding property, it has great defects in use such as inferior in spray workability, high build, and the like. These defects result from the fact that copolymers, one of the principal vehicle components, are typical high molecular weight materials and that the resin solid content in the solution is extremely low when diluted with a solvent to a viscosity suitable for the spray-coating. These defects are remedied considerably by reducing the molecular weight of the copolymer, however the properties of the films obtained thereby such as durability, weather-resistance and crack-resistance are deteriorated. On the other hand, addition of plasticizers such as butyl benzyl phthalate or dibutyl phthalate to the copolymers improves considerably the spray workability or high build. However, the film obtained by this method has a high temperature-sensitivity, and the weather-resistance and gasoline-resistance thereof are often deteriorated. A method to remedy these defects by addition of a condensation resin, particularly an alkyd resin, instead of the plasticizer, has been rare to employ in practice because the copolymer and a conventional alkyd resin are generally not compatible with each other.

The main object of the present invention is to provide a quick drying synthetic resin coating composition excellent in properties such as coating-workability, high build, weather-resistance, chemical resistance, adhesiveness and the like comprising a copolymer into which a tertiary aliphatic hydrocarbon group has been introduced in order to enhance the compatibility thereof with an alkyd resin and an alkyd resin modified with a tertiary aliphatic hydrocarbon group.

Other objects and advantages of the present invention will become apparent from the following description.

It has been known that the presence of a tertiary aliphatic hydrocarbon group in the copolymer employed for a quick drying synthetic resin coating composition has a large effect on weather-resistance and gloss. The present inventors have now succeeded in not only increasing the compatibility between the copolymer and an alkyd resin, but also in obtaining a quick drying coating composition excellent in weather-resistance and gloss by introducing a tertiary aliphatic hydrocarbon group into both the components.

In accordance with the present invention there is provided a quick drying synthetic resin coating composition comprising a solvent and a resin composition consisting essentially of (A) 100 parts by weight of a copolymer of (1) 5 to 70% by weight of at least one polymerizable monomer represented by the formula:

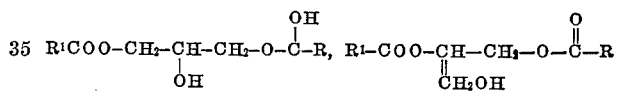

or

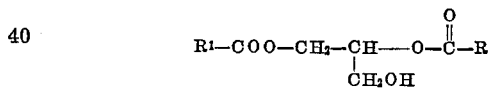

wherein R stands for a tertiary aliphatic hydrocarbon group having in total 4 to 26 carbon atoms; $R^1$ stands for an $\alpha,\beta$-ethylenically unsaturated hydrocarbon group having 2 to 3 carbon atoms which may have one $COOR^2$ group wherein $R^2$ is a hydrogen atom or an alkyl group having 1 to 4 carbon atoms and (2) 30 to 95% by weight of at least one monomer copolymerizable with said polymerizable monomer and (B) 5 to 600 parts by weight of an alkyd resin containing 1 to 70%, preferably 5 to 40%, by weight of a tertiary aliphatic carboxylic acid represented by the formula:

R—COOH wherein R has the same meaning as defined above.

The component (1) in the copolymer (A) may be prepared by the following two methods:

(i) Addition-reaction of the carboxyl group of an $\alpha,\beta$-ethylenically unsaturated carboxylic acid with the epoxy group of a glycidyl ester of a tertiary aliphatic carboxylic acid.

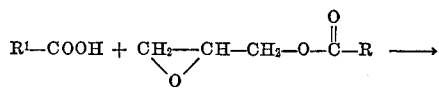

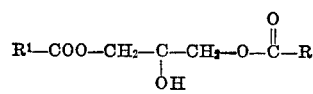

or

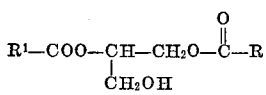

wherein R and $R^1$ have the same meanings as defined above.

(ii) Addition-reaction of the epoxy group of a glycidyl ester of an α,β-ethylenically unsaturated carboxylic acid with the carboxyl group of a tertiary aliphatic carboxylic acid.

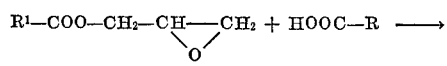

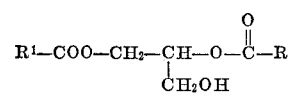

or

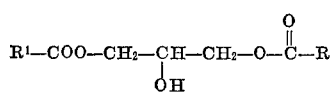

wherein both R and $R^1$ have the same meanings as defined above.

The aforesaid addition reactions may be carried out before or after the copolymerization reaction. The aforesaid addition reaction may also be carried out simultaneously with the copolymerization reaction. The addition reaction product may be used as produced or after isolation.

Examples of α,β-ethylenically unsaturated carboxylic acids employed for the addition reaction (i) include unsaturated monocarboxylic acids such as acrylic acid, methacrylic acid, crotonic acid and the like; unsaturated dicarboxylic acids such as itaconic acid, maleic acid, fumaric acid and the like; monoesters of these unsaturated dicarboxylic acids with alkanols having 1 to 4 carbon atoms. These may be used alone or in combination of two or more. As the glycidyl ester of tertiary aliphatic carboxylic acid, there may be used "Cardura E" (a trademark of Shell Chemical Company for a mixture of compounds having the formula:

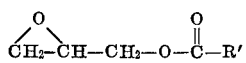

wherein R' is a saturated $C_8$ to $C_{11}$ tertiary aliphatic branched chain hydrocarbon radical).

Examples of glycidyl esters of α,β-ethylenically unsaturated carboxylic acids employed for the addition reaction (ii) include glycidyl acrylate, glycidyl methacrylate, glycidyl crotonate, monoglycidyl itaconate, monoglycidyl maleate, monoglycidyl fumarate, a glycidyl ester of monoalkyl ($C_1$–$C_4$) itaconate, a glycidyl ester of monoalkyl ($C_1$–$C_4$) fumarate, a glycidyl ester of monoalkyl ($C_1$–$C_4$) maleate and the like. These may be used alone or in combination of two or more. As the tertiary carboxylic acids there may be used "Versatic Acid 911" (a trademark of Shell Chemical Company for a mixture of compounds having the formula,

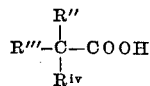

wherein R", R'" and $R^{iv}$ are aliphatic groups having 8 to 10 carbon atoms in total), neopentanoic acid, neoheptanoic acid neodecanoic acid neotridecanoic acid and the like. These acids may be used alone or in combination of two or more.

The addition reactions (i) and (ii) proceed smoothly without side reactions at a temperature of from 80° to 180° C., preferably 140° to 170° C. In the addition reaction, Lewis base catalysts such as a tertiary amine and the like may be employed if necessary.

The proportion of the monomer component (1) in the copolymer (A) ranges from 5 to 70% by weight and below this range it cannot impart a sufficient compatibility with the alkyd resin (B) to the copolymer (A). A particularly preferred proportion is from 6 to 40% by weight.

Examples of the copolymerizable monomer (2) in the copolymer (A) are those having 2 to 30 carbon atoms and include esters of acrylic acid or methacrylic acid with alkanols having 1 to 16 carbon atoms, for example, methyl acrylate, methyl methacrylate, butyl acrylate, or butyl methacrylate; vinyl esters of saturated fatty acids such as vinyl acetate, vinyl propionate and the like; mono- and di-olefinic hydrocarbons such as styrene, vinyl toluene, α-methylstyrene, ethylene, butadiene and the like; unsaturated amides such as acrylamide, methacrylamide and the like; unsaturated nitriles such as acrylonitrile, methacrylonitrile and the like; methylolated unsaturated amides such as N-methylol acrylamide, N-methylol methacrylamide and the like; alkylethers of methylolated unsaturated amides such as N-methylol methacrylamide alkyl ethers, N-methylol acrylamide alkyl ethers and the like, hydroxyalkyl acrylates or methacrylates such as hydroxymethyl acrylate, hydroxypropyl acrylate, hydroxyethyl methacrylate, hydroxybutyl methacrylate and the like; polymerizable monomers having a non-drying oil fatty acid residue, a semidrying oil fatty acid residue or a drying oil fatty acid residue, for example, addition-reaction products represented by the formula:

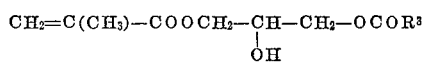

wherein $R^3$ stands for an oil fatty acid residue, e.g., coconut oil fatty acid residue, castor oil fatty acid residue, peanut oil fatty acid residue, rice bran oil fatty acid residue, cotton-seed oil fatty acid residue, soybean oil fatty acid residue, sunflower oil fatty acid residue, tung oil fatty acid residue, perilla oil fatty acid residue, linseed oil fatty acid residue, hempseed oil fatty acid residue, and the like.

For the preparation of the copolymer (A) a conventional method for the polymerization of, for example, methyl methacrylate or styrene can be employed. The polymerization reaction is preferably carried out in a solvent at a temperature of from 70° to 160° C. in the presence of a polymerization initiator such as a peroxide or an azo compound.

The above-mentioned alkyd resin, the (B) component, may be prepared by reacting either a tertiary aliphatic carboxylic acid or glycidyl ester thereof with a polybasic acid having 3 to 30 carbon atoms, a polyhydric alcohol having 2 to 30 carbon atoms and optionally an oil or a fatty acid by a conventional method for the preparation of an alkyd resin (cf. T. C. Patton, "Alkyd Resin Technology, Formulating Techniques and Allied Calculations," Interscience Publishers, 1962, New York). Examples of the polybasic acid include phthalic acid, phthalic anhydride, isophthalic acid, terephthalic acid, tetrahydrophthalic acid, tetrahydrophthalic anhydride, trimellitic acid, trimellitic anhydride, maleic acid, maleic anhydride, fumaric acid, succinic acid, adipic acid, sebacic acid and the like and examples of the polyhydric alcohol include ethylene glycol, propylene glycol, diethylene glycol, neopentyl glycol, glycerin, trimethylol ethane, trimethylol propane, pentaerythritol, sorbitol and the like and they are employed alone or in combination of two or more. As the oils there may be employed tung oil, tall oil, linseed oil, dehydrated castor oil, soybean oil, cottonseed oil, olive oil, castor oil, coconut oil and the like and fatty acids thereof alone or in combination of two or more.

The compatibility of the aforesaid copolymer with said alkyd resin depends upon the polybasic acids and polyhydric alcohols employed in the alkyd resin, and it is greatly improved when said alkyd resin contains 1 to 70% by weight of the tertiary aliphatic carboxylic acid component. This is perhaps due to a high chemical affinity between the pendent tertiary aliphatic hydrocarbon group in the copolymer and the tertiary aliphatic hydrocarbon group in the alkyd resin.

The proportion of the copolymer (A) to the alkyd resin (B) may be varied over a wide range depending upon the performance of coating required by uses. For vehicles, said proportion is 100:5–100 parts by weight, for vessels and buildings, it is 100:100–600 parts by weight and for general appliances, it is 100:50–200 parts. Outside these ranges, satisfactory products are not obtained.

Examples of the solvents and diluents employed for the preparation of the copolymer and alkyd resin or the quick drying synthetic resin coating composition of the present invention or application thereof include aliphatic, cycloaliphatic and aromatic hydrocarbons, ethers, esters, ketones, alcohols and the like and they are employed alone or in combination of two or more. Particularly frequently employed are ethyl acetate, butyl acetate, methyl ethyl ketone, methyl isobutyl ketone, toluene, xylene, ethylene glycol monoethyl ether acetate, butanol and the like.

The amount of the solvent is 20 to 95% by weight based on the total weight of the composition.

Plasticizers and pigments conventionally employed in paints and additives added in the preparation of paints and application thereof such as silicone resin or surface active agents may be employed in conventional amounts.

The amount of pigments employed in the quick drying synthetic resin paint of the present invention varies largely depending upon the kind of pigments employed, and it is preferably from 1 to 280% by weight based upon the resin solids.

The volume of solvents and diluents to be added at the application of paints varies depending upon the coating method. The ratio of resin solids to solvents or diluents in the paint at the time of coating is preferably from 60:40 to 10:90.

In the quick drying synthetic resin coating composition of the present invention, cellulosic derivatives such as nitrocellulose, cellulose acetate butyrate and the like, other polymeric materials such as melamine-formaldehyde resin, benzoguanamine-formaldehyde resin, or urea-formaldehyde resin can be added in a conventional range, that is to say, in the range of the ratio of the combined weight of the copolymer and alkyd resin obtained in accordance with the present invention to the weight of these cellulosic derivatives or amino resin solids of from 100:0 to 70:30. Further, metallic salt dryers such as cobalt, manganese, lead, zirconium and the like may be added in a conventional amount.

The quick drying synthetic resin coating composition of the present invention can be applied to a substrate by spray-coating, brush-coating, immersion-coating, roller-coating and the like. The film obtained from the present coating composition can be cured by allowing it to stand at room temperature and also by heating to a temperature below 300° C.

Suitable substrates to be coated with the quick drying synthetic resin coating composition of the present invention are metals, wood, rubber, glass, fibers, a variety of plastic moldings and the like.

The present invention is illustrated by the following examples, in which all parts are by weight unless otherwise specified.

EXAMPLE 1

(1–a)

| | Parts |
|---|---|
| "Cardura E" | 875.00 |
| Methacrylic acid | 344.00 |
| Xylene | 305.00 |
| Hydroquinone | 0.18 |

Said reactants were charged into a reaction vessel and heated to 140° C. with stirring. The addition reaction of the epoxy group in "Cardura E" with the carboxyl group of methacrylic acid was traced while quantitatively determining the remaining carboxyl group in the system.

The addition reaction was a considerable exothermic reaction and xylene was added to prevent a sudden overheating of the system and hydroquinone was added to prevent a polymerization reaction at this reaction stage. The addition reaction was completed in about 40 minutes. Consequently, a polymerizable addition reaction product solution was obtained. This polymerizable addition reaction product may, of course, be isolated from the system and purified, however, in the present invention, there is no necessity of isolation and purification of the product and the xylene solution containing a total amount of 80% by weight of the addition reaction product obtained in said reaction and a trace amount of methacrylic acid remaining owing to the addition in a slight excess (the acid number of said solution being 18) was used as such.

(1–b)

| | Parts |
|---|---|
| Addition reaction product solution obtained in (1–a) | 80.0 |
| Methyl methacrylate | 336.0 |
| Xylene | 268.0 |
| Toluene | 160.0 |

Said reactants were charged into a reaction vessel and heated to reflux with stirring. While maintaining the refluxing condition, a polymerization initiator solution obtained by dissolving 4.0 parts of azobisisobutyronitrile in 160.0 parts of ethyl acetate was added in two hours to effect the polymerization reaction. After the completion of the addition, the reactants were heated to reflux for a further 2 hours with stirring. The thus obtained copolymer resin solution contained 40% of non-volatile matters.

(1–c)

| | Parts |
|---|---|
| Phthalic anhydride | 444.0 |
| Glycerin | 135.0 |
| "Cardura E" | 375.0 |
| Xylene | 70.0 |

The reactants were charged into a reaction vessel and subjected to esterification reaction at a reflux temperature while removing water out of the system in the form of an azeotropic mixture with xylene. The esterification was continued until the acid number reached 2, and then cooled to 120° C. A mixture of 148.0 parts of phthalic anhydride and 250.0 parts of "Cardura E" were added and the reaction was continued at 150° C. until the acid number reached 7, and then diluted with xylene to give a resin solution containing 70% of non-volatile matters.

(1–d)

| | Parts |
|---|---|
| Copolymer resin solution obtained in (1–b) | 150.0 |
| Alkyd resin solution obtained in (1–c) | 120.0 |

Said components were mixed to give a paint.

EXAMPLE 2

(2–a)

| | Parts |
|---|---|
| Addition reaction product solution obtained in Example (1–a) | 100.0 |
| Methyl methacrylate | 200.0 |
| n-Butyl acrylate | 120.0 |
| Xylene | 264.0 |
| Toluene | 160.0 |

Said reactants were charged into a reaction vessel and copolymerization reaction was carried out in the same manner as in Example (1–b) using an initiator comprising 4.0 parts of azobisisobutyronitrile and 160.0 parts of ethyl acetate. The thus obtained resin solution contained 40% of non-volatile matters.

(2-b)

| | Parts |
|---|---|
| Phthalic anhydride | 214.0 |
| Glycerin | 96.0 |
| Soybean oil fatty acid | 575.0 |
| "Cardura E" | 240.0 |
| Xylene | 57.0 |

Said reactants were charged into a reaction vessel and heated and esterification reaction was carried out at a refluxing temperature. The condensed water was removed out of the system in the form of an azeotropic mixture with xylene. The reaction was continued until the acid number reached 4, and the reaction mixture was cooled and diluted with xylene to give a resin solution containing 70% of non-volatile matters.

(2-c)

| | Parts |
|---|---|
| Copolymer synthetic resin solution obtained in (2-a) | 35.0 |
| Alkyd resin solution obtained in (2-b) | 100.0 |
| Solution of cobalt naphthenate in xylene (Co content: 6%) | 1.0 |
| Rutile type titanium oxide "R-820" (a product of Ishihara Sangyo Co.) | 50.0 |

Said components were mixed and dispersed to obtain a paint.

EXAMPLE 3

(3-a)

| | Parts |
|---|---|
| Additional reaction product solution obtained in Example (1-a) | 150.0 |
| Styrene | 150.0 |
| Ethyl acrylate | 30.0 |
| Butyl acrylate | 30.0 |
| 2-hydroxyethyl methacrylate | 40.0 |
| Xylene | 254.0 |
| Toluene | 160.0 |

Said reactants were charged into a reaction vessel and a copolymerization reaction was carried out in the same manner as in Example (1-b) using an initiator solution comprising 4.0 parts of azobisisobutyronitrile and 160.0 parts of ethyl acetate. The thus obtained resin solution contained 40% of non-volatile matters and viscosity thereof was T(Gardner-Holdt visometer).

(3-b)

| | Parts |
|---|---|
| Neopentyl glycol | 130.0 |
| Trimellitic anhydride | 303.0 |
| Xylene | 20.0 |

Said reactants were charged into a reaction vessel, heated to reflux and the esterification reaction was effected for 3 hours while removing water out of the system and then cooled to 150° C. 500.0 parts of "Cardura E" was added and the reaction was continued at 150° C. for a further 30 minutes. The reaction mixture was diluted with xylene to give a resin solution containing 60% of non-volatile matters.

(3-c)

| | Parts |
|---|---|
| Copolymer resin solution obtained in (3-a) | 85.0 |
| Alkyd resin solution obtained in (3-b) | 110.0 |
| Benzoguanamine-formaldehyde resin solution) "Nikalack BL-60" a trademark of Nippon Carbide Co. Ltd. for an amino resin containing 60% of non-volatile matter) | 40.0 |
| Aluminium pigment "Alpaste 1109 MA" (a trade mark of Toyo Aluminium Co. Ltd.) | 3.3 |
| Colored pigment "Microlith 4 GT Blue" (a trademark of Ciba Corp.) | 2.5 |

Said ingredients were mixed and dispersed to obtain a paint.

EXAMPLE 4

(4-a)

| | Parts |
|---|---|
| Addition reaction product solution obtained in Example (1-a) | 125.0 |
| Methyl methacrylate | 180.0 |
| Styrene | 100.0 |
| Butyl methacrylate | 20.0 |
| Xylene | 260.0 |
| Toluene | 160.0 |

Said reactants were charged into a reaction vessel and subjected to polymerization reaction in the same manner as in Example (1-b) using an initiator solution comprising 40 parts of azobisisobutyronitrile and 160.0 parts of ethyl acetate. The thus obtained resin solution contained 40% of non-volatile matters.

(4-b)

| | Parts |
|---|---|
| Phthalic anhydride | 74.0 |
| Glycerin | 91.0 |
| Coconut oil fatty acid | 220.0 |
| Xylene | 25.0 |

Said reactants were charged into a reaction vessel and subjected to esterification reaction at 240° C. while refluxing xylene until the acid number reached 1.2. The reaction mixture was cooled to 100° C. 222.0 parts of phthalic anhydride and 376.0 parts of "Cardura E" were added thereto, and the esterification reaction was further continued at 250° C. until the acid number reached 7. The reaction product was cooled and diluted with xylene so that the non-volatile matter content was 7.5%.

(4-c)

| | Parts |
|---|---|
| Copolymer resin solution obtained in (4-a) | 110.0 |
| Alkyd resin solution obtained in (4-b) | 48.0 |
| 20% Solution of ½″ nitrocellulose (in a mixed solvent comprising toluene, butyl acetate and butanol in a ratio of 50:30:20) | 100.0 |
| Carbon black | 2.0 |

Said components were mixed and dispersed to obtain a paint.

(4-d)

| | Parts |
|---|---|
| Copolymer resin solution obtained in (4-a) | 70.0 |
| Alkyd resin solution obtained in (4-b) | 76.0 |
| 20% solution of ½″ nitro-cellulose | 75.0 |
| Titanium white | 50.0 |

Said components were mixed and dispersed to obtain a paint.

EXAMPLE 5

(5-a)

| | Parts |
|---|---|
| Glycidyl methacrylate | 142.0 |
| Castor oil fatty acid | 330.0 |
| N,N'-diethylaminoethyl methacrylate | 0.14 |
| Hydroquinone | 0.28 |

Said reactants were charged into a reaction vessel and heated with stirring in a nitrogen gas atmosphere and the reaction was continued for 5 hours at 120° C. The addition reaction was completed in an about 100% yield.

(5-b)

| | Parts |
|---|---|
| Addition reaction product solution obtained in (1-a) | 100.0 |
| Addition reaction product solution obtained in (5-a) | 80.0 |
| Methyl methacrylate | 140.0 |
| Styrene | 80.0 |
| Butyl acrylate | 20.0 |
| Xylene | 264.0 |
| Toluene | 160.0 |

Said reactants were charged into a reaction vessel and the polymerization reaction was effected in the same manner as in Example (1–b) using an initiator solution comprising 4.0 parts of azobisisobutyronitrile and 180 parts of ethyl acetate. The thus obtained resin solution contained 40% of non-volatile matters.

(5–c)

| | Parts |
|---|---|
| Copolymer resin solution obtained in (5–b) | 145.0 |
| Alkyd resin solution obtained in (3–b) | 70.0 |
| Butylated melamine resin solution "super Beckman G812" [non-volatile matters: 50% solvent: xylene/butanol (a product of Nihon Reichhold Co. Ltd.)] | 30.0 |
| Titanium white | 50.0 |

Said components were mixed and dispersed to obtain a paint.

(5–d)

| | Parts |
|---|---|
| Copolymer resin solution obtained in (5–b) | 150.0 |
| Alkyd resin solution obtained in (4–b) | 32.0 |
| 20% solution of ½" nitrocellulose | 80.0 |
| Microlith 4GT Blue | 3.5 |

Said components were mixed and dispersed to obtain a paint.

EXAMPLE 6

(6–a)

| | Parts |
|---|---|
| Addition reaction product solution obtained in (1–a) | 260.0 |
| Methyl methacrylate | 142.0 |
| Butyl acrylate | 50.0 |
| Xylene | 230.0 |
| Toluene | 160.0 |

Said reactants were charged into a reaction vessel and the polymerization reaction was carried out in the same manner as in Example (1–b) using an initiator solution comprising 4.0 parts of azobisisobutyronitrile and 160.0 parts of ethyl acetate. The thus obtained resin solution contained 40% of non-volatile matters.

(6–b)

| | Parts |
|---|---|
| Phthalic anhydride | 74.0 |
| Glycerin | 74.0 |
| Fatty acid of dehydrated castor oil | 280.0 |
| Xylene | 25.0 |

Said reactants were charged into a reaction vessel and subjected to esterification reaction at 240° C. while refluxing xylene until the acid number reached 1.6 and the reaction mixture was cooled to 100° C. Subsequently 281.0 parts of phthalic anhydride and 600.0 parts of "Cardura E" were added thereto and the esterification reaction was further continued at 250° C. until the acid number reached 10. The reaction mixture was cooled and diluted with xylene so that the non-volatile matter content was 70%.

(6–c)

| | Parts |
|---|---|
| Copolymer solution obtained in (6–a) | 70.0 |
| Alkyd resin solution obtained in (6–b) | 100.0 |
| Titanium white | 100.0 |
| Xylene solution of cobalt naphthenate (cobalt content: 6%) | 1.0 |

Said components where mixed and dispersed to obtain a paint.

EXAMPLE 7

(7–a)

| | Parts |
|---|---|
| Addition reaction product solution obtained in Example (1–a) | 50.0 |
| Methyl methacrylate | 340.0 |
| Lauryl methacrylate | 20.0 |
| Xylene | 274.0 |
| Toluene | 160.0 |

Said reactants were charged into a reaction vessel and to reflux with stirring. While maintaining the reflux condition, a polymerization initiator solution comprising 4 parts of azobsisobutyronitrile and 160.0 parts of ethyl acetate was added dropwise over two hours. After the completion of the addition, the reaction mixture was heated to reflux for a further two hours with stirring. The thus obtained copolymer resin solution contained 40% of non-volatile matters and the viscosity thereof was P as measured by means of a Gardner-Holdt viscometer.

(7–b)

| | Parts |
|---|---|
| Phthalic anhydride | 444.0 |
| Glycerin | 120.0 |
| "Cardura E" | 500.0 |
| Xylene | 80.0 |

Said reactants were charged into a reaction vessel and heated to 240° C. while refluxing xylene. Esterification reaction was carried out while removing water out of the system in the form of an azeotropic mixture with xylene. Esterification was continued until the acid number reached 2, and subsequently the temperature was lowered to 120° C. Then 148.0 parts of phthalic anhydride and 250.0 parts of "Cardura E" were added thereto and the reaction was continued at 150° C. until the acid number reached 7 and the reaction product was then diluted with xylene to obtain a resin solution containing 70% of non-volatile matters. The viscosity thereof was X as measured by means of a Gardner-Holdt viscometer.

(7–c)

| | Parts |
|---|---|
| Copolymer resin solution obtained in (7–a) | 150.0 |
| Alkyd resin solution obtained in (7–b) | 57.2 |

Said components were mixed to obtain a paint.

EXAMPLE 8

(8–a)

| | Parts |
|---|---|
| Additional reaction product solution obtained in Example (1–a) | 100.0 |
| Methyl methacrylate | 300.0 |
| n-Butyl acrylate | 20.0 |
| Xylene | 264.0 |
| Toluene | 160.0 |

Said reactants were charged into a reaction vessel and the copolymerization reaction was carried out in the same manner as in Example (1–b) using an initiator solution comprising 4.0 parts of azobisisobutyronitrile and 160.0 parts of ethyl acetate. The resulting resin solution contained 40% of non-volatile matters and the viscosity thereof was U as measured by means of a Gardner-Holdt viscometer.

(8–b)

| | Parts |
|---|---|
| Phthalic anhydride | 214.0 |
| Adipic acid | 61.0 |
| Glycerin | 96.0 |
| Fatty acid of dehydrated castor oil | 337.0 |
| "Cardura E" | 240.0 |
| Xylene | 57.0 |

Said reactants were charged into a reaction vessel and esterification reaction was carried out at a temperature from 200 to 240° C. while refluxing xylene. The condensed water was removed out of the system in the form of an azeotropic mixture with xylene. The reaction was continued until the acid number reached 4 and the reaction mixture was cooled and 250 parts of xylene was added thereto to yield a resin solution having non-volatile matters of 75% and the viscosity of X as measured by means of a Gardner-Holdt viscometer.

(8-c)

| | Parts |
|---|---|
| Copolymer resin solution obtained in (8-a) | 160.0 |
| Alkyd resin solution obtained in (8-b) | 21.4 |
| Rutile type titanium oxide "R-820" | 64.0 |

Said components were mixed and dispersed to give a paint.

EXAMPLE 9

(9-a)

| | Parts |
|---|---|
| Solution of the addition reaction product obtained in Example (1-a) | 150.0 |
| Methyl methacrylate | 280.0 |
| Xylene | 254.0 |
| Toluene | 160.0 |

Said reactants were charged into a reaction vessel and copolymerization reaction was carried out in the same manner as in Example (1-b) using an initiator solution comprising 4.0 parts of azobisisobutyronitrile and 160.0 parts of ethyl acetate. The resulting resin solution contained 40% of non-volatile matters and the viscosity thereof was T as measured by means of a Gardner-Holdt viscometer.

(9-b)

| | Parts |
|---|---|
| Neopentyl glycol | 156.0 |
| Trimellitic anhydride | 288.0 |
| Xylene | 18.0 |

Said reactants were charged into a reaction vessel and esterification reaction was carried out at a temperature of from 160° to 200° C. until the acid number reached 20, while refluxing xylene and removing water from the system and subsequently the temperature was lowered to 150° C. 375.0 parts of "Cardura E" was added thereto and the reaction was continued at 150° C. for an additional 30 minutes and the reaction product was diluted with xylene to give a resin solution containing 55% of non-volatile matters and the viscosity thereof was X as measured by means of a Gardner-Holdt viscometer.

(9-c)

| | Parts |
|---|---|
| Copolymer resin solution obtained in (9-a) | 135.0 |
| Alkyd resin solution obtained in (9-b) | 10.9 |
| Butyl benzyl phthalate | 18.0 |
| Aluminium pigment "Alpaste 1109MA" | 3.3 |
| Colored pigment "Microlith 4 G Blue" | 2.5 |

Said components were mixed and dispersed to give a paint.

EXAMPLE 10

(10-a)

| | Parts |
|---|---|
| Addition reaction product solution obtained in Example (1-a) | 200.0 |
| Methyl methacrylate | 240.0 |
| Xylene | 244.0 |
| Toluene | 160.0 |

Said reactants were charged into a reaction vessel and polymerization reaction was carried out in the same manner as in Example (1-b) using an initiator solution comprising 4.0 parts of azobisisobutyronitrile and 160.0 parts of ethyl acetate. The resulting resin solution had a non-volatile matter content of 40% and the viscosity of T as measured by means of a Gardner-Holdt viscometer.

(10-b)

| | Parts |
|---|---|
| Phthalic anhydride | 70.0 |
| Glycerin | 91.0 |
| Fatty acid of dehydrated castor oil | 200.0 |
| Xylene | 27.0 |

Said reactants were charged into a reaction vessel and esterification reaction was carried out at 240° C. while refluxing xylene until the acid number reached 1.2. The reaction mixture was cooled to 100° C. and after addition of 222.0 parts of phthalic anhydride and 376.0 parts of "Cardura E" the esterification reaction was further continued at 250° C. until the acid number reached 7. The reaction mixture was cooled and diluted with xylene so that the non-volatile matter content was 75%. The viscosity thereof was U as measured by means of a Gardner-Holdt viscometer.

(10-c)

| | Parts |
|---|---|
| Copolymer resin solution obtained in (10-a) | 140.0 |
| Alkyd resin solution obtained in (10-b) | 32.0 |
| Rutile type titanium oxide "R-820" | 64.0 |

Said components were mixed and dispersed to give a paint.

EXAMPLE 11

(11-a)

| | Parts |
|---|---|
| Addition reaction product solution obtained in Example (1-a) | 13 |
| Styrene | 20 |
| Methyl methacrylate | 65 |
| n-Butyl acrylate | 5 |
| Toluene | 67 |

Said reactants were charged into a reaction vessel, and a solution consisting of 1.2 parts of azobisisobutyronitrile and 30.0 parts of butyl acetate was dropped thereinto in two hours. The resulting mixture was subjected to polymerization in the same manner as in Example (1-b) to obtain a copolymer. The content of non-volatile matters in the resulting resin solution was 50%, and the viscosity thereof was X by means of Gardner-Holdt viscometer.

(11-b)

| | Parts |
|---|---|
| Phthalic anhydride | 371 |
| Trimethylol ethane | 209 |
| Coconut oil fatty acid | 106 |
| "Cardura E" | 249 |
| Xylene | 65 |

These components were charged into a reaction vessel, and the temperature was gradually raised to 240° C. while blowing a nitrogen gas into the mixture. Reaction was continued to an acid value of less than 10 while removing water of reaction in the form of an azeotropic mixture with xylene. The reaction product was cooled to 130° C., at which temperature xylene was added thereto to obtain a resin solution containing 50% of non-volatile matters and having a viscosity of H by means of Gardner-Holdt viscometer.

(11-c)

| | Parts |
|---|---|
| ½" cellulose acetate butyrate | 20 |
| Methyl ethyl ketone | 40 |
| Toluene | 40 |

These were mixed to obtain a homogeneous solution.

(11–d)

| | Parts |
|---|---|
| Copolymer resin solution obtained in (11–a) | 200 |
| Alkyd resin solution obtained in (11–b) | 100 |
| Cellulose acetate butyrate obtained in (11–C) | 160 |
| Aluminium pigment "Alpaste 1109MA" | 6 |
| Colored pigment "Microlith 4GT Blue" | 4 |

These were mixed and dispersed to obtain a paint.

Subsequently, a description is hereinafter made on the film properties of paints obtained in Examples (1–d), (2–c), (4–c), (4–d), (5–d), (6–d), (7–c), (8–c), (9–c), (10–c) and (11–d) as a quick drying synthetic resin paint.

First of all, the paints of Examples (1–d), (4–c), (4–d), and (5–d) were diluted with a diluting solvent comprising 15 parts of ethyl acetate, 45 parts of toluene, 20 parts of xylene, 10 parts of isobutanol and 10 parts of ethylene glycol monoethyl ether acetate until they had the viscosity of 15 to 25 seconds as measured with the ford-cup No. 4 at 20° C. This was applied by an air-spray onto a steel-panel having a thickness of 0.8 mm. on which an epoxy-resin modified acrylic primer had been applied and it was dried at room temperature for seven days. The thickness of the dried film was so adjusted that the thickness of the primer was about 40 microns and that of the quick drying synthetic resin paint was from 40 to 50 microns.

The gloss of the resulting film was measured by means of a Murakami's glossmeter at an angle of 60°. The surface hardness of the coated film was examined by a pencil scratching hardness. The impact strength was measured by a Du Pont type impact tester on a stand having a diameter of ½ inch using a weight of 500 g. The adhesiveness was measured by making 100 squares having 2 mm. width on the coated film with a recording needle, sticking an adhesive type thereon, and stripping off the same forcibly. When there was no square stripped off at all, it was estimated "passed." Water-resistance was tested by soaking in the city water at room temperature for 240 hours. Gasoline-resistance was determined by spotting a high octane gasoline on the coated film and evaporating the same at room temperature and observing any abnormal state on the coated film. The results of the above tests were as shown in Table 1.

As is apparent from Table 1, any coated film was excellent and the workability was also excellent.

TABLE 1

| | Paints | | | | | | | | |
|---|---|---|---|---|---|---|---|---|---|
| Testings | Example (1–d) | Example (4–c) | Example (4–d) | Example (5–d) | Example (7–c) | Example (8–c) | Example (9–c) | Example (10–c) | Example (11–d) |
| Gloss | 94 | 96 | 91 | 93 | 92 | 90 | 93 | 92 | 90. |
| Pencil hardness | F | H | F | H | H | H | F | H | H. |
| Impact strength (cm.) | 20 | 20 | 30 | 20 | 30 | 30 | 30 | 20 | 30. |
| Adhesiveness | Passed | Passed | Passed | Passed | Passed | Passed | Passed | Passed | Passed. |
| Water-resistance | Not abnormal | Not abnormal | Not abnormal | Not abnormal | Not abnormal | Not abnormal | Not abnormal | Not abnormal | Not abnormal. |
| Gasoline-resistance | do | do | do | do | do | do | do | do | Do. |

Paints of Examples (2–c) and 6–c) were diluted with a diluent comprising 30 parts of toluene and 80 parts of xylene, so that the viscosity of each paint was about 50 at 20° C. as expressed by the Stormer viscosity. This was applied with a brush to a steel plate to which an epoxy resin anti-corrositive primer had been applied and dried at room temperature for 14 days.

As the result of the exposure of the resulting coated film to the nature for a year, each film proved to be excellent, and no abnormality was found except for a slight reduction of the gloss.

Still more, these paints are suitable for various coating methods such as spray-coating, air-less spray coating, curtain-wall coater and the like.

Paints of Examples (3–c) and 5–c) are plate-curing type paints. Paints obtained in Examples (3–c) and (5–c) diluted with a diluent comprising toluene/xylene/butanol in a proportion of 4/4/2 were applied by spray-coating to a steel plate having a thickness of 0.8 mm. treated with a zinc phosphate type surface treating agent and were plated, cured and dried at 140° C. for 32 minutes. The thickness of the dried film was so controlled as to be 25 to 35μ at the spray-coating.

The properties of the resulting coated film were examined according to the methods described in the case of Example (1–d) and the results are shown in Table 2.

TABLE 2

| | Example (3–c) | Example (5–c) |
|---|---|---|
| Gloss | 94 | 88. |
| Pencil hardness | H | H. |
| Impact strength (cm.) | 40 | 30. |
| Adhesiveness | Passed | Passed. |
| Water-resistance | Not abnormal | Not abnormal. |
| Gasoline-resistance | do | Do. |

What is claimed is:

1. A quick drying synthetic resin coating composition comprising 20 to 95 percent by weight based on the total weight of the composition of at least one solvent selected from the group consisting of aliphatic, cycloaliphatic and aromatic hydrocarbons, ethers, esters, ketones and alcohols and a resin composition consisting of (A) 100 parts by weight of a copolymer of (1) 5 to 70 percent by weight of at least one polymerizable monomer represented by the following formula:

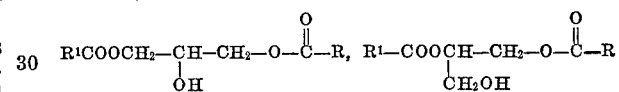

or

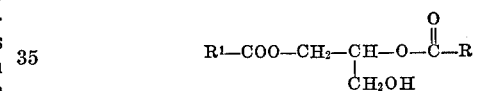

wherein R stands for a tertiary aliphatic hydrocarbon group having in total 4 to 26 carbon atoms; $R^1$ stands for an alpha, beta-ethylenically unsaturated hydrocarbon group having 2 to 3 carbon atoms which may have one $COOR^2$ group wherein $R^2$ is a hydrogen atom or an alkyl group having 1 to 4 carbon atoms, and (2) correspondingly 30 to 95% by weight of at least one monomer copolymerizable with said polymerizable monomer (1) and (B) 5 to 600 parts by weight of an alkyd resin containing 1 to 70% by weight of a tertiary aliphatic carboxylic acid represented by the formula:

wherein R has the same meaning as defined above.

2. A composition according to claim 1, wherein the component (1) is an addition reaction product of an α,β-ethylenically unsaturated carboxylic acid represented by the formula:

$R^1$—COOH wherein $R^1$ has the same meaning as defined above with a glycidyl ester of a tertiary aliphatic carboxylic acid represented by the formula:

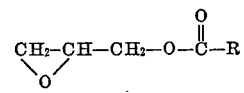

wherein R has the same meaning as defined above.

3. A composition according to claim 2, wherein the α,β-ethylenically unsaturated carboxylic acid is an unsaturated monocarboxylic acid having 3 to 4 carbon atoms, an unsaturated dicarboxylic acid having 4 to 5 carbon atoms, or a monoester of said dicarboxylic acid with an alkanol having 1 to 4 carbon atoms.

4. A composition according to claim 3, wherein the unsaturated monocarboxylic acid is acrylic acid, methacrylic acid or crotonic acid.

5. A composition according to claim 3, wherein the unsaturated dicarboxylic acid is itaconic acid, maleic acid, or fumaric acid.

6. A composition according to claim 2, wherein the glycidyl ester of a tertiary aliphatic carboxylic acid is a mixture of compounds having the formula, $$\overset{O}{\underset{CH_2-CH}{\diagup\!\!\diagdown}}-CH_2-O-\overset{O}{\underset{\|}{C}}-R'$$

wherein R' is a saturated $C_8$ to $C_{11}$ tertiary aliphatic branched chain hydrocarbon radical.

7. A composition according to claim 1, wherein the component (1) is an addition reaction product of a glycidyl ester of an α,β-ethylenically unsaturated carboxylic acid represented by the formula:

$$R^1-COO-CH_2-\underset{\diagdown\!\!O\!\!\diagup}{CH-CH_2}$$

wherein $R^1$ has the same meaning as defined above, with a tertiary aliphatic carboxylic acid represented by the formula:

HOOCR wherein R has the same meaning as defined above.

8. A composition according to claim 7, wherein the glycidyl ester of α,β-ethylenically unsaturated carboxylic acid is glycidyl acrylate, glycidyl methacrylate, glycidyl crotonate, monoglycidyl itaconate, monoglycidyl maleate, or monoglycidyl fumarate.

9. A composition according to claim 7, wherein the tertiary aliphatic carboxylic acid is neopentanoic acid, neoheptanoic acid, neodecanoic acid, neotridecanoic acid or a mixture of compounds having the formula, $$R'''-\underset{\underset{R^{iv}}{|}}{\overset{\overset{R''}{|}}{C}}-COOH$$

wherein R'', R''' and $R^{iv}$ are aliphatic groups having 8 to 10 carbon atoms in total.

10. A composition according to claim 1, wherein the component (2) is an ester of an alkanol having 1 to 16 carbon atoms with acrylic acid or methacrylic acid; a vinyl ester of a saturated aliphatic carboxylic acid; mono- or diolefinic hydrocarbon; an unsaturated nitrile; an unsaturated amide, a methylolated unsaturated amide, a methylolated unsaturated amide alkyl ether; or a hydroxy alkyl acrylate or methacrylate.

11. A composition according to claim 1, wherein the component (2) is methyl acrylate, ethyl acrylate, propyl acrylate, butyl acrylate, methyl methacrylate, ethyl methacrylate, propyl methacrylate, butyl methacrylate, vinyl acetate, vinyl propionate, styrene, vinyl toluene, α-methylstyrene, ethylene, butadiene, acrylonitrile, methacrylonitrile, acrylamide, methacrylamide, N-methylolated acrylamide, N-methylolated methacrylamide, hydroxyethyl acrylate, hydroxypropyl acrylate, hydroxyethyl methcarylate or hydroxybutyl methacrylate.

12. A composition according to claim 1, wherein the component (2) is a polymerizable monomer represented by the formula:

$$CH_2=C(CH_3)-COOCH_2-\underset{\underset{OH}{|}}{CH}-CH_2OCOR^3$$

wherein $R_3$ stands for a non-drying oil fatty acid residue, semi-drying oil fatty acid residue, or a drying oil fatty acid residue.

13. A composition according to claim 1, wherein the component (B) is a reaction product of a tertiary aliphatic carboxylic acid represented by the formula:

RCOOH wherein R has the same meaning as defined above, or glycidyl ester thereof, with a polybasic acid having 3 to 30 carbon atoms and a polyhydric alcohol having 2 to 30 carbon atoms.

14. A composition according to claim 13, wherein the polybasic acid is phthalic anhydride, trimellitic anhydride, or adipic acid.

15. A composition according to claim 13, wherein the polyhydric alcohol is glycerin or neopentyl glycol.

16. A composition according to claim 13, wherein the tertiary aliphatic carboxylic acid or glycidyl ester thereof is a compound having the formula, $$\overset{O}{\underset{CH_2-CH}{\diagup\!\!\diagdown}}-CH_2-O-\overset{O}{\underset{\|}{C}}-R'$$

wherein R' is a saturated $C_8$ to $C_{11}$ tertiary aliphatic branched chain hydrocarbon radical, a mixture of compounds having the formula, $$R'''-\underset{\underset{R^{iv}}{|}}{\overset{\overset{R''}{|}}{C}}-COOH$$

wherein R'', R''' and $R^{iv}$ are aliphatic groups having 8 to 10 carbon atoms in total, neopentanoic acid, neoheptanoic acid, neodecanoic acid or neotridecanoic acid.

17. A composition according to claim 26, wherein the oil or fatty acid is soybean oil fatty acid, coconut oil fatty acid, castor oil fatty acid, or dehydrated castor oil fatty acid.

18. A composition according to claim 1, wherein the copolymer (A) consists of (1) 5 to 50% by weight of a polymerizable monomer represented by the formula $$R^1COOCH_2-\underset{\underset{OH}{|}}{CH}-CH_2-O-\overset{O}{\underset{\|}{C}}-R, \quad R^1-COO-\underset{\underset{CH_2OH}{|}}{CH}-CH_2-O-\overset{O}{\underset{\|}{C}}-R$$

or $$R^1-COO-CH_2-\underset{\underset{CH_2OH}{|}}{CH}-O-\overset{O}{\underset{\|}{C}}-R$$

wherein R and $R^1$ have the same meanings as defined above, and (2) 50 to 95% by weight of methyl methacrylate and 0 to 45% by weight of at least one olefinic unsaturated monomer.

19. A composition according to claim 18, wherein the alkyd resin (B) contains 10 to 60% by weight of a tertiary aliphatic carboxylic acid component represented by the formula:

R—COOH wherein R has the same meaning as defined above, and the amount of said alkyd resin is 5 to 100 parts by weight per 100 parts by weight of the copolymer (A).

20. A composition according to claim 1, which further contains 1 to 280% by weight of pigments based upon the resin solids.

21. A composition according to claim 1, wherein the solvent is ethyl acetate, butyl acetate, methyl ethyl ketone, methyl isobutyl ketone, toluene, xylene, ethylene glycol monoethyl ether acetate or butanol.

22. A composition according to claim 1, wherein the amount of the solvent is 20 to 95% by weight based on the total weight of the composition.

23. A composition according to claim 1, wherein the component (1) is an addition reaction product of methacrylic acid with a glycidyl ester of a tertiary aliphatic carboxylic acid represented by the formula:

$$\overset{O}{\underset{CH_2-CH}{\diagup\!\!\diagdown}}-CH_2-O-\overset{O}{\underset{\|}{C}}-R$$

wherein R is a saturated $C_8$ to $C_{11}$ tertiary aliphatic branched chain hydrocarbon radical.

24. A composition according to claim 1, wherein component (2) is methyl methacrylate.

25. A composition according to claim 1, wherein the component (B) is a reaction product of phthalic anhydride with a glycidyl ester of a tertiary aliphatic carboxylic acid represented by the formula:

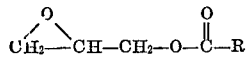

wherein R is a saturated $C_8$ to $C_{11}$ tertiary aliphatic branched chain hydrocarbon radical.

26. A composition according to claim 1, wherein the component (B) is a reaction product of a tertiary aliphatic carboxylic acid represented by the formula:

RCOOH wherein R has the same meaning as defined in claim 1, or glycidyl esters thereof, with a polybasic acid having 3 to 30 carbon atoms, a polyhydric alcohol having 2 to 30 carbon atoms and an oil or fatty acid.

References Cited
UNITED STATES PATENTS 3,448,089   6/1969   Celeste _____ 260—78.5 T
3,600,345   8/1971   Levine _____ 260—22 C B WILLIAM H. SHORT, Primary Examiner E. WOODBERRY, Assistant Examiner U.S. Cl. X.R.

117—161 K; 260—16, 23 P, 31.2 R, 32.8 R, 33.6 R, 40 R, 78.5 T, 873